US006438690B1

(12) United States Patent
Patel et al.

(10) Patent No.: US 6,438,690 B1
(45) Date of Patent: Aug. 20, 2002

(54) VAULT CONTROLLER BASED REGISTRATION APPLICATION SERVING WEB BASED REGISTRATION AUTHORITIES AND END USERS FOR CONDUCTING ELECTRONIC COMMERCE IN SECURE END-TO-END DISTRIBUTED INFORMATION SYSTEM

(75) Inventors: Paresh Patel, Leicester (GB); Ku Lee, Germantown; Roger Reider, Silver Spring, both of MD (US); Drew Kittel, Washington, DC (US); Lolo Lasida, Alexandria, VA (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/223,834

(22) Filed: Dec. 31, 1998

Related U.S. Application Data

(60) Provisional application No. 60/087,974, filed on Jun. 4, 1998.

(51) Int. Cl.[7] .............................. H04L 9/00; H06F 1/26
(52) U.S. Cl. ...................... 713/156; 713/155; 713/201; 713/158; 380/30; 705/44
(58) Field of Search ................................ 713/157, 155, 713/158, 201, 156, 172, 162, 164; 705/65, 44, 76, 9; 380/30, 282, 285, 255, 277, 278; 340/937, 928

(56) References Cited

U.S. PATENT DOCUMENTS

| | | | |
|---|---|---|---|
| 4,771,459 A | 9/1988 | Jansen | |
| 4,868,877 A | 9/1989 | Fischer | |
| 4,914,176 A | 4/1990 | Wang | |
| 5,005,200 A | 4/1991 | Fischer | |
| 5,218,637 A | 6/1993 | Angebaud et al. | |
| 5,261,002 A * | 11/1993 | Perlman et al. | 380/30 |
| 5,263,165 A | 11/1993 | Janis | |
| 5,481,610 A | 1/1996 | Doiron et al. | |
| 5,530,758 A | 6/1996 | Marino et al. | |
| 5,629,980 A | 5/1997 | Stefik et al. | |
| 5,640,501 A | 6/1997 | Turpin | |
| 5,729,594 A | 3/1998 | Klingman | |
| 5,742,683 A | 4/1998 | Lee et al. | |
| 5,745,574 A | 4/1998 | Muftic | |
| 5,790,677 A | 8/1998 | Fox et al. | |
| 5,799,285 A | 8/1998 | Klingman | |
| 5,850,442 A | 12/1998 | Muftic | |
| 5,903,882 A * | 5/1999 | Asay et al. | 380/30 |
| 6,044,462 A * | 3/2000 | Zubeldia et al. | 380/30 |
| 6,105,131 A * | 8/2000 | Carroll | 380/258 |
| 6,202,159 B1 * | 3/2001 | Ghafir et al. | 713/151 |

* cited by examiner

*Primary Examiner*—Ly V. Hua
(74) *Attorney, Agent, or Firm*—Joseph C. Redmond, Jr.; Morgan & Finnegan, LLP

(57) ABSTRACT

A secure end-to-end communications system includes a vault controller based registration application for managing the issuance and administration of digital certificates for use in conducting electronic commerce in the system. The system includes an end user terminal and a registration authority terminal coupled to a vault controller through the system. A registration application executable in the controller utilizes SSL and dedicated vaults to process requests for digital certificates from end users on an automated or manual basis. The registration application includes an enrollment module which implements the process of applying for and receiving certificates; an RA desk top module which allows an administrator to review certificate requests and manage certificates; a master Registration Authority (RA) module which conducts the processing of requests and the generation of certificates; and an RA (Registration Authority) database serves as a repository of information about applicants, certificate requests, and their processing history.

15 Claims, 9 Drawing Sheets

VAULT CONTROLLER BASED REGISTRATION APPLICATION SERVING WEB BASED REGISTRATION AUTHORITIES AND END USERS FOR CONDUCTING ELECTRONIC COMMERCE IN SECURE END-TO-END DISTRIBUTED INFORMATION SYSTEM

CROSS-REFERENCE TO RELATED APPLICATION

This application is related to non-provisional application Ser. No. 08/980,022 filed Jun. 13, 1997, assigned to the same assignee as that of the present invention and fully incorporated herein by reference.

This application claims the benefit of the filing date of provisional application entitled "Secure Server Using Public Key Registration and Methods of Operation", Serial No. 60/087,974, filed Jun. 4, 1998, assigned to the same assignee as that of the present invention, and fully incorporated herein.

BACKGROUND OF THE INVENTION

1. Field of the Invention

This invention relates to secure end-to-end communications systems. More particularly, the invention relates to a vault controller based registration application serving web-based registration authorities and end users for conducting electronic commerce in a secure end-to-end distributed information system, e.g. the Internet.

2. Background Discussion

Traditionally, organizations, such as retailers, banks, and insurance companies in conducting electronic business, register their customers or users and control their access to business software applications with a user identification (user ID) and password. The user ID and password establish a user identity for accessing secure information. The password is the "virtual key" that authenticates a user. However, a password does not provide the security needed for electronic business. Passwords have the following limitations:

(a) Can be compromised during log-on by on-lookers;

(b) Can be easily intercepted on the internet if the transaction is not secured with a secure web protocol, such as a secure socket layer (SSL);

(c) Authenticate a user to a host but not a host to a user;

(d) Can be discovered using automatic "trial and error" techniques;

(e) Do not protect transmitted information; and (f) Do not ensure the access is limited to authorized entities and applications.

A new approach to conducting electronic business on the internet is described in the cross-reference application. In this approach, digital keys have replaced user identification password pairs. Public key cryptography uses mathematically related public-private key pairs. Only the private key can decrypt the information the public key has encrypted. The public key can be made available to anyone. The private key is kept secret by the holder.

Just as digital keys are replacing user identification-password pairs in electronic business, digital signatures are replacing physical signatures. A digital signature is a coded message affixed to a document or data that helps guarantee the identity of the sender, thereby providing a greater level of security of the physical signature. A digital signature identifies the sender because only the sender's private key can create the signature. The key also helps ensure the content of the signed message cannot be altered without the recipient being able to discover that the message has been altered. Digital certificates are replacing their physical counterpart—hard copy credentials. Digital certificates issued by a certification authority vouch for (or certify) the key of an individual, software application, organization or business. The certificate performs a role similar to that of a driver's license or medical diploma—the certificate certifies that the bearer of the corresponding private key is authorized (by an organization) to conduct certain activities for that organization.

However, the life cycle of digital certificates is similar to that of physical certificates. Digital certificates are issued after authorization in which a user is given the right to use a digital certificate for a classified amount of time. The certificate may be temporarily suspended when a user reports a lost certificate. The certificate may be resumed or revoked by the organization. Finally, digital certificates expire and for secure end-to-end communications in electronic business, the certificate must be validated to determine whether the certificate has expired, been revoked, or suspended.

Digital certificates are issued through authorized registrars known as Registration Authorities (RAs). The RAs determine whether the applicant should be authorized to access secure applications or services and set in motion a process to issue a certificate. A Certification Authority (CA) issues the digital certificate after approval by the Registration Authority. The certificate is a binding between a public key and an identity, i.e., a person, organization, or computer device. The certificate includes a subject name; issuer name; public key; validity; unique serial number; and CA digital signature. A CA guarantee's the authenticity of the certificate through its digital signature. The certificate may be revoked at any time. The serial numbers of the revoked certificates are added to a Certification Revoked List (CRL) published in an X.500 Directory based on a standard defined by the International Telecommunications Union (ITU).

A secure operating environment is required by RAs and end users in conducting the registration process for the issuance of digital certificates which uniquely identify end users. A preferred secure operating environment employs "Vault Technology", described in the above mentioned cross-related application, Ser. Number 08/980,022, filed Jun. 13, 1997. Briefly stated, "Vault Technology" provides a secure environment in a web server using a vault controller which provides security from other processes running on the same server. The vault controller provides secure areas or personal storage vaults e.g. a directory on a disk to which only the owner has a key linked to a digital certificate. System operators, administrators, certificate authorities, registration authorities and others cannot get to stored information or secure processes in such personal vaults. Combined with a Secure Sockets Layer (SSL), the controller enables secure registration transactions that require multiple sessions using personal vaults. The personal vault is owned by a particular UNIX account that is linked to a user with a specific vault access certificate. The content of the vault is encrypted and contains an encryption key pair and signing key pair, both of which are password protected. Each vault has a unique distinguished name in an X.500 Directory that provides storage for specific items essential to a Public Key Infrastructure (PKI) in carrying out the registration process.

A vault controller based registration application is needed to serve web based registration authorities and end users in managing the issuance and administration of digital certificates for accessing secure processes using PKI in conducting electronic commerce in a distributed information system, e.g. the Internet.

SUMMARY OF INVENTION

An object of the invention is a vault controller based registration application and method of operation for web based Registration Authorities and end users in conducting electronic commerce.

Another object is a vault controller based registration application including an enrollment component and method of operation which provides web pages and functions that implement a process of applying and receiving a digital certificate by an end user.

Another object is a vault controller based registration application including a RA desktop component and method of operation for web based RAs in processing end user requests for certificates.

Another object is a vault controller based registration application including a master registration application component and method of operation which supports end users and RAs in the processing of end user certificate requests and the generation of digital certificates.

Another object is master registration application including policy exit components for customizing registration application behavior consistent with customer requirements.

Another object is a vault controller based registration application including a database component and method of operation for storing and retrieving information about end user applicants, certificate requests and their processing history.

These and other objects, features and advantages are achieved in a secure end-to-end communication system using PKI for conducting electronic commerce. The system includes web based RAs and end users coupled to a vault controller. The controller includes a registration application which includes an enrollment component which provides web pages and functions that implement a vault based process of applying and receiving a digital certificate by an end user; A RA desktop component which runs in a vault and serves web based RAs in processing end user requests for certificates. A master registration application component which runs in a vault and supports end users and RAs in the processing of end user certificate requests and the generation of digital certificates. The master registration application further includes policy exit components for customizing registration application behavior consistent with customer requirements. A database component stores and retrieves information about end user applicants, certificate requests and their processing history. In one embodiment, a user submits an enrollment form to the vault controller requesting a certificate. The form contains a set of attributes including user PKI characteristics. The form is validated in the registration application by the enrollment component which submits the approved form to the master registration component. An application for a certificate is created by the master registration component for the end user and saved in the database. The master registration component adds and updates attributes to the application and subjects the application to the policy exit attributes which conform the application to the practices of the organization(s) recognizing the certificate. The application is approved or rejected by the RA desktop component. The master registration component is advised and generates the requested certificate including a Distinguished Name (DN) as an attribute, if approved for entry in an X.500 Directory. The certificate is sent to the requesting user's browser. Receipt is confirmed by the end user invoking a confirmation function in the registration application when the certificate is used. If rejected by the RA desktop, an e-mail notification is sent to the end user by the RA desktop.

DESCRIPTION OF DRAWING

The invention will be further understood from the following description of a preferred embodiment taken in conjunction with an appended drawing, in which.

DESCRIPTION OF PREFERRED EMBODIMENT

Figure 1:
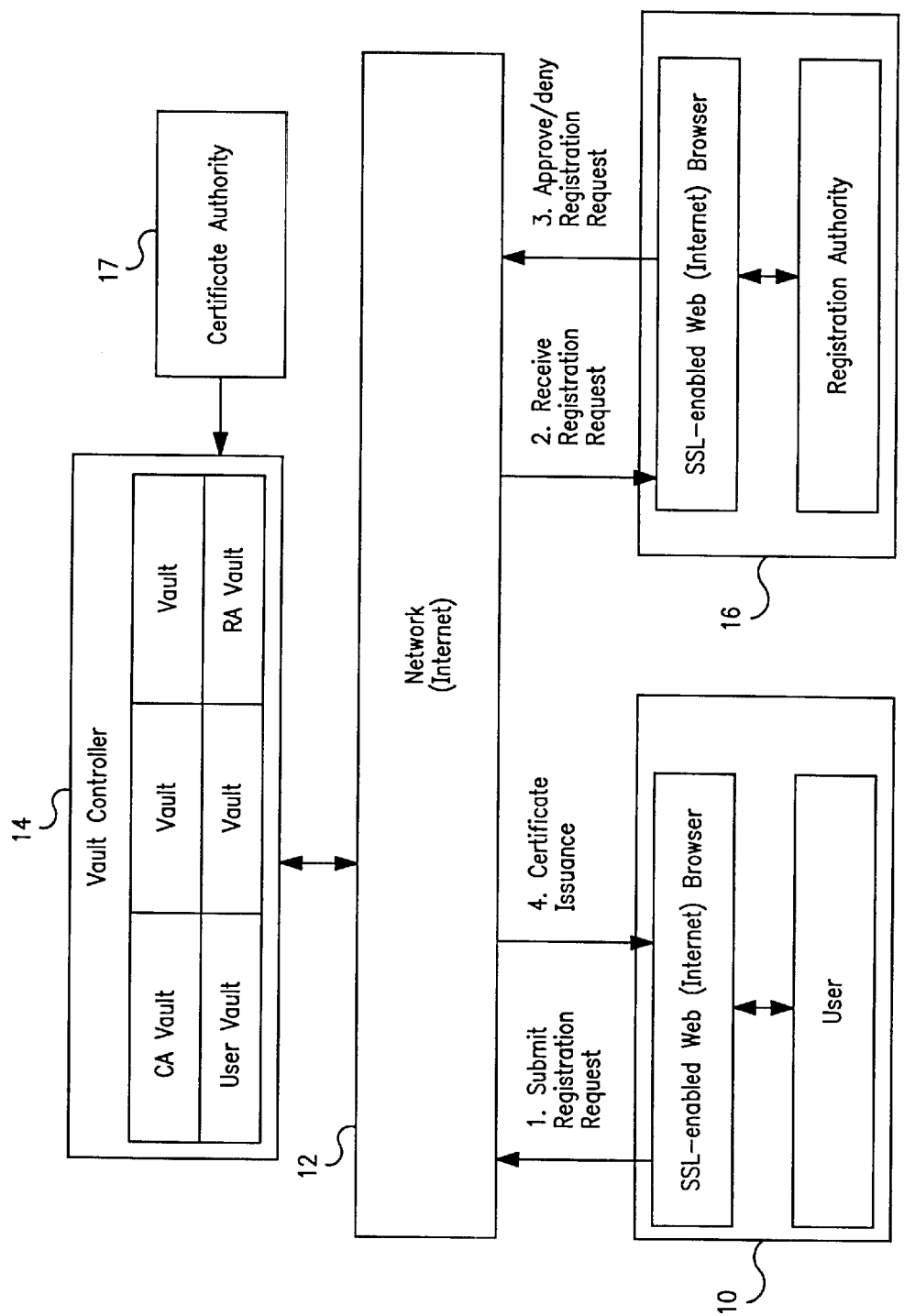
FIG. 1 is a representation of a registration authority running in a web-based vault controller for processing end user requests for digital certificates and incorporating the principles of the present invention.

In FIG. 1, an overview is disclosed of a web-based vault controller and registration application serving web based registration authorities and end users for conducting electronic commerce in a secure end-to-end distributed information system. An end user terminal 10 including a web browser (not shown) is coupled through a secure end-to-end communication system 12 using PKI to a vault controller 12 described in non-provisional application Ser. No. 08/980, 022 filed Jun. 13, 1997, is fully incorporated herein by reference. A registration authority terminal 16 is coupled to the controller 14 to register and approve/reject end user requests for digital certificates in connection with conducting electronic commerce in a secure manner with organizations and others through the system. A certificate authority is coupled to the controller to prepare user vault access certificate after user approval by the registration authority.

The typical registration process consists of six steps, as follows:

1. Applicant Submits Registration Request

Using a web browser that supports browser certificates and a Vault Registration Application and customized for an organization, an applicant fills in and submits a registration form. This form is then transmitted by way of SSL protocol to the Vault Controller 14 for processing by a Registration Authority 16 (RA).

2. RA Receives and Reviews Registration Request

The RA views applicants' pending registration requests using a Web browser that supports client certificates. Only the RA and the applicant are able to view these requests. This helps to ensure that sensitive information provided by the applicant is kept private and secure throughout the registration process.

The RA reviews each registration request. As part of the review, the RA may need to perform additional verification of the applicant's request as determined by an organization's policy. This can be done in many ways. For example, the RA can contact the applicant to ensure that the applicant (and not someone else) submitted a registration request. The RA can also validate the request by viewing information in the registration form known only to the applicant and the RA. Whatever the method, the organization has total control of the registration approval process.

3. RA Approves Registration Request

Using the Vault Registration Application 20 (See FIG. 2), the RA indicates whether an applicant's registration request should be approved or rejected. A Certification Authority (CA) 17 linked to the vault controller then electronically signs the certificate.

4. Certificate Is Issued to the Applicant

The applicant checks whether the registration request has been approved. If approved, the applicant obtains the certificate created for use in running vault based application in conducting electronic commerce with an organization.

5. Information Is Encrypted at all Times

Throughout the registration process, the information provided by the applicant is stored in a database 30 (see FIG. 3) and transmitted between processes in encrypted form.

6. Certificates Are Continually Managed

The RA provides ongoing administration of all certificates throughout their life cycle.

Figure 2:
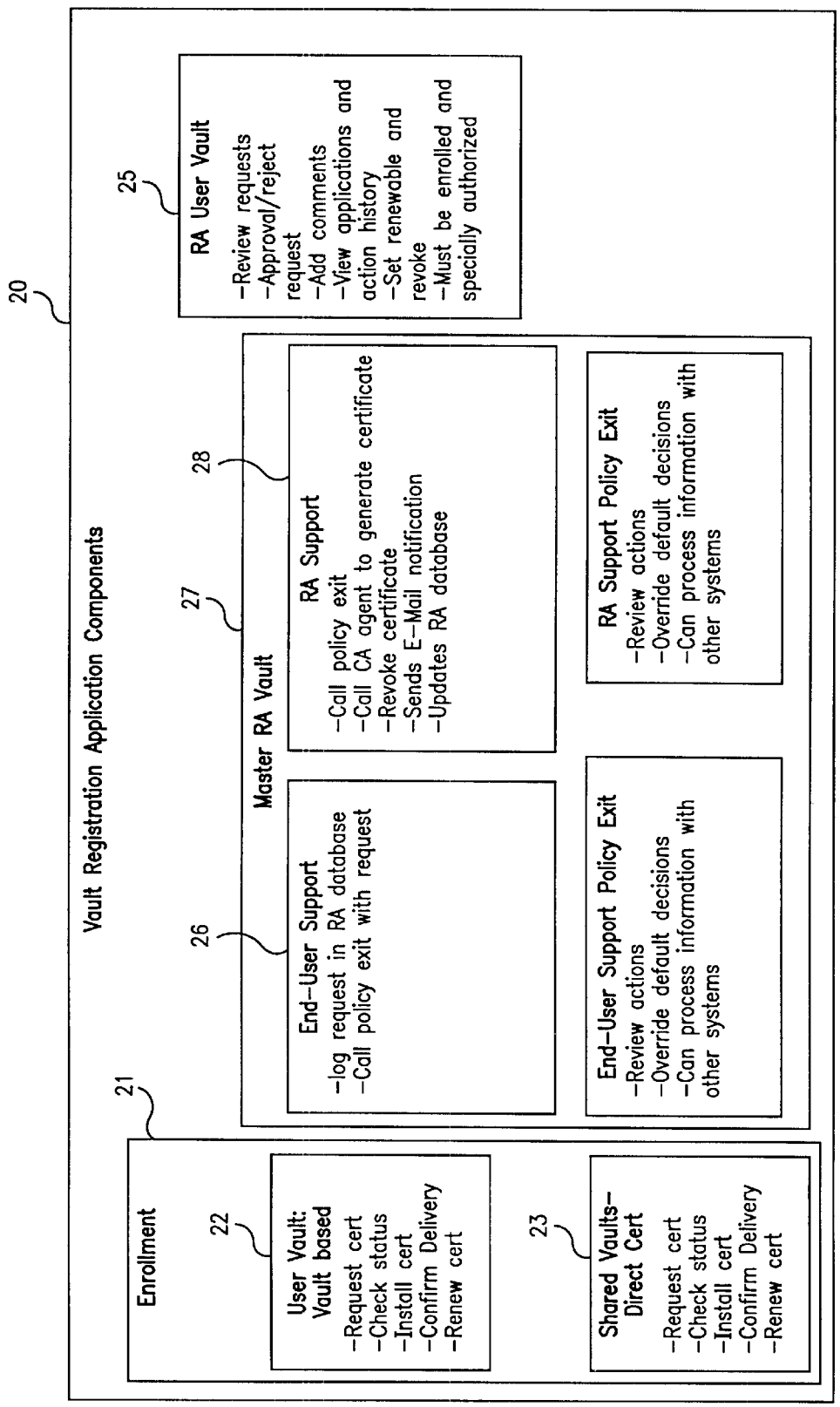
FIG. 2 is a representation of a registration application for managing the issuance and administration of digital certificates for end users and running in the vault controller of FIG. 1.

In FIG. 2, a vault controller based registration application 20 manages the issuance and administration of digital certificates for web browsers and servers. The application 20 includes components to be described hereinafter to capture end user enrollment information and deliver certificates for installation in browsers and servers for conducting electronic commerce with organizations and others. The application 20 manages the entire life cycle of certificate requests from the initial certificate through renewal and revocation of the certificate. The application 20 can be configured to issue certificates from multiple CAs or have different policies administered separately for the same CA. All information is stored in a data base 30 (see FIG. 3) that can be used to produce a variety of operational reports.

The primary components of the application 20 and their functions (to be described hereinafter) are:

An enrollment module 21 including a user vault-vault based enrollment 22 and a shared vault-direct certificate enrollment 23. The enrollment module provides web pages and function that implement the process of end users' applying for and receiving certificates.

An RA desktop module 25 which allows RA administrators to review user originated applications requests in a vault for certificates and manage certificates.

A Master Registration Authority vault 27 for processing of end user certificate request and the generation of certificates.

The database 30 (See FIG. 3) is the repository of information about applicants, certificate requests and their processing history.

Figure 3:
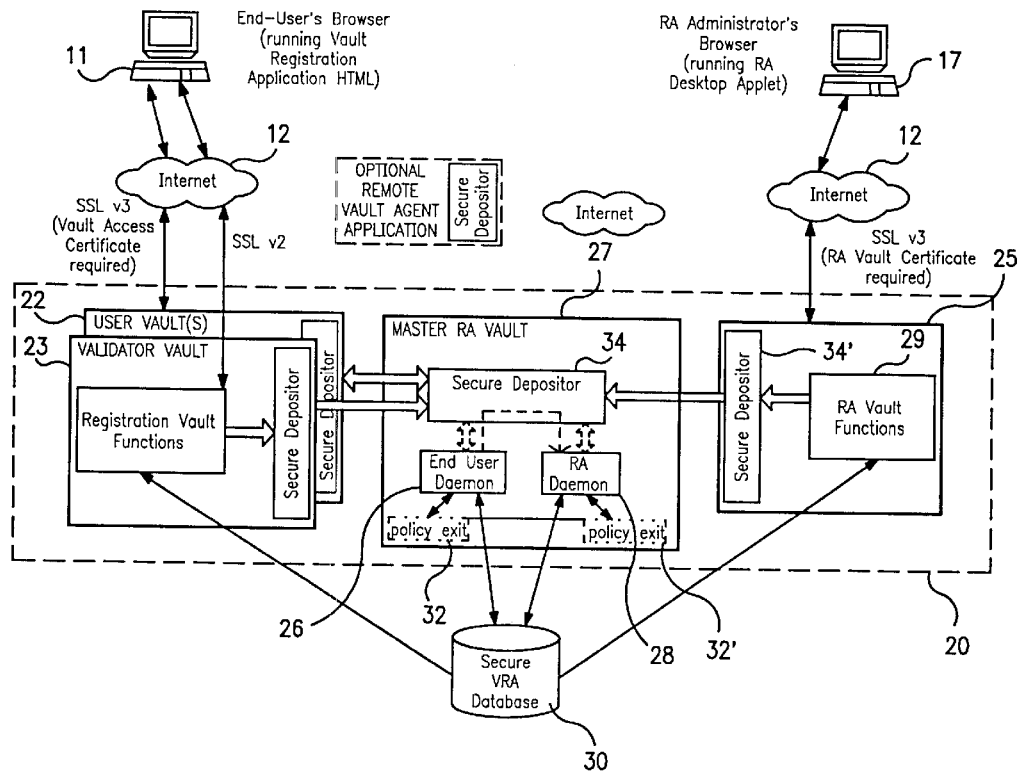
FIG. 3 is a representation of components included in the registration application of FIG. 2.

In FIG. 3, a registration process is initiated in an end user browser 11 which interacts through a communication network 12, e.g. the Internet 12 with the registration application 20 using the well known Secure Socket Layer (SSL), Version 3 or other equivalent encryption/decryption process.

The application 20 acts in a user vault based enrollment 22 or direct enrollment 23. Likewise, an RA browser 17 interacts through the internet 12 with desktop module 25 which runs in an RA vault. Both enrollment vaults 22 and 23 and desktop module 25 interact with master RA vault 27. The database 30 interacts with the enrollment vaults 22, 23; the desktop vault and the master RA vault, as will now be described.

Enrollment encompasses the facilities required to capture information from individuals applying for certificates and to deliver the completed certificates to their final destination. These facilities consist of a variety of HTML panels, vault functions, and scripts that provide the user-visible "front-end" to the Vault Registration Application. A variety of enrollment approaches are available. All of these can be easily customized to meet specific customer requirements in areas that include content and appearance. For Web browser certificates, enrollment is supported using a vault (known as vault-based enrollment) or directly without a vault (known as non-vault based enrollment). Server enrollment is available only using vaults.

Vault-based enrollment 22 requires the applicant to first acquire a vault. Once the vault is available, the applicant enters that vault to apply for a certificate. The use of the vault provides better security for the overall enrollment and delivery process because it provides a guaranteed and authenticated association between the applicant and the applicant's certificate application.

Validator or Direct Certificate enrollment 23 does not require a vault and has fewer steps than vault-based enrollment. In this case, each certificate application, or request, is assigned a unique request identifier. This identifier must be presented to the Vault Registration Application services to obtain status and the certificate. If this identifier is lost or modified, the enrollment process cannot be completed.

An optional challenge question and response can be employed to further authenticate the applicant and the associated certificate application. If specified during the initial enrollment steps, the challenge question is displayed when the applicant checks the status of the application or tries to install the certificate. The applicant must provide the correct response to the challenge question before the processing will continue.

In those situations where a customer requires a highly specialized enrollment approach that is not supported by the supplied Vault Registration Application facilities, Vault Agent facilities can be used to implement a custom enrollment approach. Vault Agent facilities allow a program to completely bypass the Vault Registration Application enrollment facilities and work directly with the Master RAs to process applications for certificates. In this manner, any conceivable approach can be implemented. The security of the overall enrollment process, however, is largely determined by the strength of the customer's implementation of the Vault Registration Application.

The Vault Registration Application 20 can also electronically mail a notification to the applicant when the application has been processed. Separate letter templates can be used for rejections and approvals. Substitution symbols in the letter templates can be used to substitute the applicant's name and other selected information. The resulting letter is sent to the applicant. For approvals, these letters can contain a URL that will expedite the user's return to the Vault Registration Application 20 to obtain the certificate. Rejection letters can contain a reason.

Master RAs 27 include background (daemon) processes 26, 28 that service requests for certificates through a secure depositor 34 which is a process that receives encrypted messages on a communication port and delivers the message to a queue. The processes 26, 28 receive messages from the enrollment facilities, update the Vault Registration Application database, call policy exits, generate certificates, and e-mail notifications. The processes 26, 27 embody the core business rules that ultimately govern the certificate issuance process.

The daemons 26, 27 operate continuously in a Master RA Vault 27. This vault is allocated during Vault Registration Application installation and customization. Master RAs can be configured to service one or more application domains. Each domain defines a set of resources and rules that organize and govern the registration process for an organization. The number of Master RAs in operation is largely determined by scalability and security considerations.

When an enrollment request is completed it is sent to the Master RA for processing. The Master RA creates a certificate application in the RA Database 30 to save the enrollment information and manage the request process. The enrollment information is then sent to a customer-supplied policy exit 32, 32' to determine if it can be automatically approved, require manual approval, or is rejected (for example, if it contains insufficient or incorrect information).

If the request is rejected, an e-mail can be sent to the applicant with an explanation. For an approved request, a certificate is generated, then the e-mail can be sent notifying the applicant of the approval. A request requiring manual approval is not processed any further. An RA administrator must process the request before the Master RA will taken any further actions.

Two separate daemons work together to support enrollment and RA Administration: End user Support 26 and RA Support 28. The End User daemon 26 works closely with the supplied Vault Registration Application enrollment facilities to process the initial enrollment request into the RA Database. It also updates the database when the applicant retrieves the certificate. The RA Support daemon 28 works closely with the RA Administration facilities (known as the RA Desktop) to process manual approval or rejection actions. Other actions taken by a RA administrator such as, renewals and revocations, are also processed by the RA Support daemon.

Every update operation on the certificate application is recorded in the RA Database as a series of actions. These actions provide a chronology of events associated with the request from its origination through its expiration and renewal. Action histories for specific applications can be viewed through the RA Desktop. Actions cannot be modified or deleted.

All Master RA actions are reviewed by customer defined policy exits 32, 32' before any further processing is undertaken. Each daemon can be configured to call the same or a separate policy exit program. The entire action plus supporting information from the RA Database is supplied to the policy exit. The policy exit can perform whatever processing is needed. When it finishes processing, it can specify the disposition of the action to be taken.

It is possible for the policy exit to override any action about to be taken by an RA Administrator. For example, it can overturn an approval action or approve a rejection. Policy exits can also be used to satisfy specific requirements such as work flow management or contacting legacy systems about the request.

Exits can return additional information that will be carried with the application in the form of policy exit variables. These variables can override corresponding values in the original enrollment message for certificate extensions, certificate subject names, and a few others. Variables returned from one policy exit are supplied to all other policy exit calls. Subsequent policy exits have the ability to replace or modify these variables. Original enrollment information cannot be modified once it has been stored in the RA Database.

The RA Desktop 25 is the facility that RA administrators use to view and process applications for certificates. The desktop provides a task-oriented set of capabilities or functions working through a secure depositor 34' for viewing applications, renewing, and revoking certificates. RA administrators perform a very important role when no automated means of approving certificate requests can be accomplished in the master RA policy exits. In this situation, a RA administrator must review the application and apply the origination's policies governing the issuance of certificates to determine if the request can be approved or rejected.

When requests can be automatically approved or rejected, the RA Desktop is often used to view certificate applications when questions arise. It is also used when certificates have to be revoked or if their renewal status must be changed. When certificates are made renewable, e-mail notifications can be sent to the certificate holders asking them to return to a URL included in the note to renew their certificate. This offers a convenient mechanism for reminding certificate holders to renew their certificates before they expire.

RA administrators access the RA Desktop using Netscape 4.x or Microsoft 4.x Web browsers. The server-side functions of the RA Desktop execute within vaults that are authorized to perform RA actions on a specific set of certificate applications. RA administrators must complete special enrollment procedures to become authorized. This process allocates a vault for an RA administrator and establishes special permissions to perform RA administration functions depending upon the configuration of the Vault Registration Application. RA administrators can be authorized to process certificate requests for one or more sets of certificate requests known as application domains. This can be useful when several low volume domains require support by a single RA administrator.

Multiple step review procedures are supported using an "add comment" capability. This feature enables an RA administrator to view a request and add a comment to the action history without approving or rejecting the request. Using this capability, other RA administrators review the action history to verify prior steps have been completed satisfactorily before they take their actions.

In low volume environments, work flow management among a group of RA administrators requires procedures and coordination outside the scope of the Vault Registration Application software. For example, one RA administrator might agree to handle all requests in which the applicant's last name starts with "A" through "M." However, sophisticated work flow management requires a custom implementation effort because the Vault Registration Application does not provide this capability itself. The Vault Registration Application can be easily extended using its policy exits to operate with almost any work flow management system.

The RA database 30 is the repository of all information known about the application, the certificate application, and the actions associated with processing the certificate request.

Figure 3A:
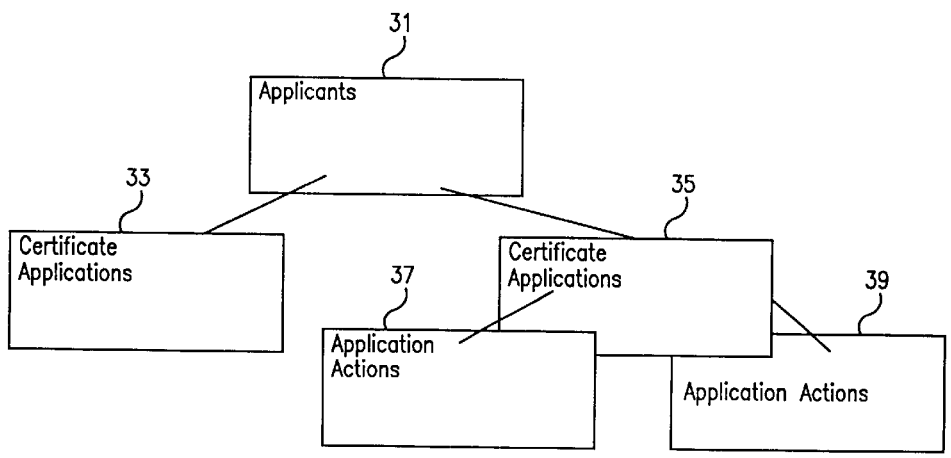
FIG. 3A is a representation of a data model for a secure database included in FIG. 3.

In FIG. 3A, the Registration Database persists and contains important information about each certificate request made to the Registration Authority. The Registration Authority (RA) Administration Application uses the database to identify and select requests for processing and to track their processing status.

Each RA database is maintained in a separate database instance that is housed in the RA's vault. While many "authorized" RA administrators can access the database concurrently, any confidential information is encrypted in the database using the RA's key. In all cases, only public information is stored as plain text in the database. As an additional precaution, each RA database can have its own set of security grants and permissions distinct and separate from all other RA databases. The database also provides support for generating reports and status information.

The RA Database is composed of the following tables: Applicants 31, Certificate Applications 33, 35, and Actions 37, 39, all linked together as shown.

The Applicants table maintains information about each person applying for a certificate. A person can have many applications in varying states at any one time. Applicant ID is a generated identifier that uniquely identifies this applicant from all others. Present design creates a 24-byte MD5 hash of the applicant's name and location (expected to be an e-mail address) to generate this identification field. This field is primarily used for relating additional information to the applicant, such as individual applications.

The Applications Table

The certificate tables 33, 35 contain information about requests for certificates and their status.

Actions Table

The Actions table maintains information about the processing actions taken against the certificate application. The entries that are recorded in the table function as a combined audit trail and event log. This table has no primary key. It is indexed on the Application ID field so all actions are associated with a specific certificate.

All Vault Registration Application components use the RA Database to query certificate applications for processing. Optimistic locking improves the database concurrency when multiple users are accessing the database. Database records are protected against simultaneous updates. Intervening update detection ensures multiple updates do not result in data loss.

One or more application domains can use a single RA Database. When multiple domains share the same database, RA administrators are able to perform their duties on multiple domains using one vault and associated vault certificate. An application domain is a unique implementation of a registration process. The unique application defines a set of resources, policies and configuration options related to specific registration processes. All registration application functions base their processing on application domain definitions. The domain name uniquely identifies the application to the vault controller. Master RAs can be configured to work across multiple databases because they automatically change database connections as needed. In situations where this is not desirable, Master RAs and RA administrators can be configured or authorized to access only one database.

Optionally, confidential information can be encrypted. Confidential information includes the original request data, policy exit variables, application comment, and action comments. Additionally, each row is digitally signed when encryption is enabled. This provides another level of tampering detection should someone attempt to surreptitiously modify the RA Database.

Access control using relational database grants further restricts unauthorized access to the database. During installation and configuration, all public access to the database is revoked except for the database administrator. The Master RA is granted select and update, but not delete, access to the databases. RA administrators receive select access when they are enrolled. Only users specifically granted access to the RA Database are able to retrieve or update information.

The database can also support a variety of operational reports. Using standard query facilities it is possible to develop a series of report scripts that list:

Counts of certificates issued;

Counts by status of applications; and

Counts of applications received per hour and by day.

Many other reports are also possible. Reports containing any of the confidential data fields are not possible using standard relational database facilities when encryption is enabled.

Figure 4:
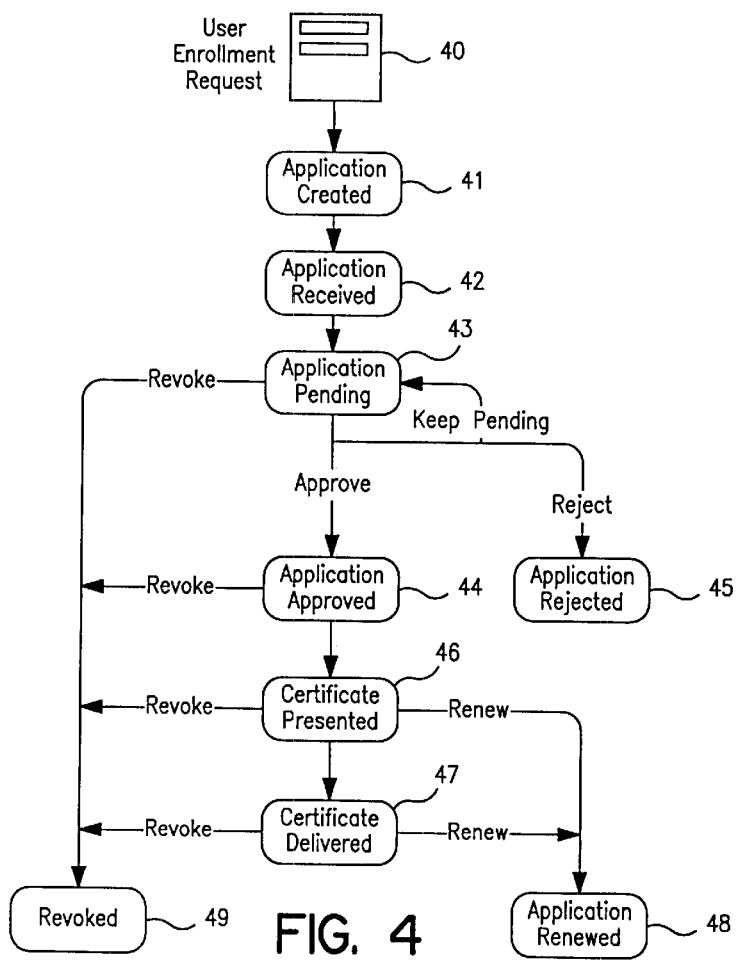
FIG. 4 is a flow diagram of a life cycle for a certificate request executed by the registration application in FIG. 2.

In FIG. 4, the life cycle of a certificate request begins with a user enrollment request 40. In step 41, an application has been created based on a certificate request initiated by a user. For non-vault based requests, this state appears twice in the Action history. It appears the first time when the application is created. It appears the second time when the application is updated with a request ID. For vault-based requests, this state appears once.

In step 42, the Master RA has received the certificate application and initiated processing. The Master RA has not yet invoked the end user policy exit.

In step 43, a policy exit has been invoked and a certificate request requires further processing before its final disposition can be determined. An application will remain in this state until an RA administrator uses the RA Desktop to approve or reject it.

In step 44, a policy exit has been invoked and a certificate application has been approved. The Master RA then uses the information contained in the application to generate the requested certificate. When the certificate is ready, it is stored in the database. An e-mail notification of the availability of the certificate is also sent to the user, if the user requested notification. A comment that describes the reason for the rejection can also be placed in the application to display on a status screen for the user to view during the enrollment process.

In step 46, the Vault Registration Application has sent a certificate to the user's Web browser. Limitations of the certificate installation protocol make it difficult to guarantee that the certificate has been successfully installed in its target location in the case of the server requests (for example, a Web browser or Web server). The Vault Registration Application provides a confirmation function (initiated by the user) that verifies the successful installation of Web browser and Web server certificates.

In step 47, the user has successfully used the presented Web browser certificate by invoking a confirmation function in the Vault Registration Application. The Vault Registration Application is assured that the certificate is in the user's Web browser.

In step 48, the user has successfully completed the initial renewal request. A new renewal application is created and maintained as a separate application in the RA Database.

In step 49, an application or a certificate has been revoked. If a certificate has not yet been issued for an application and a revocation action is taken, the enrollment process for the application is stopped. If a certificate has been issued for an application and a revocation action is taken, the revocation action is recorded in the Certificate Revocation List (CRL) in the X.500 directory.

Figure 5:
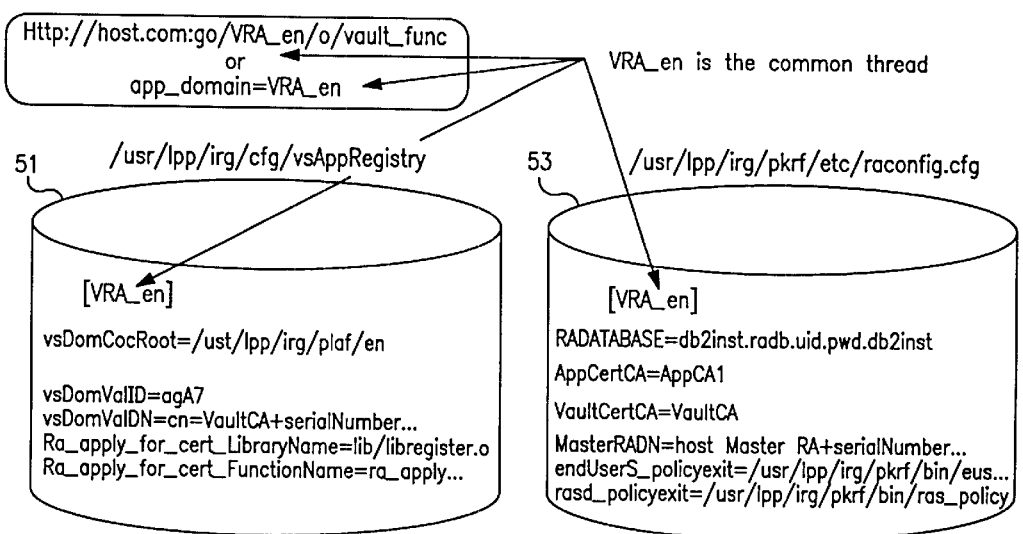
FIG. 5 is a representation vault controller configuration information for customizing the registration application of FIG. 2.

In FIG. 5, Vault Registration Application (VRA) configuration information is stored in the database as a file. Vault Registration Application's configuration information is maintained in a reconfiguration file 51 (vsVaultRegistry). Values for the configuration items can be shared across different amplification domains or kept separate. This flexibility enables maximum reuse of resources while allowing domain-specific differences in selected definitions. One or more files 51 can exist in a single Vault Controller server since the location of the file is relative to an application domainroot (vsDomDocRoot).

The default installation for Vault Registration Application defines one configuration file 53 as /usr/lpp/irg/pkrf/etc/raconfig.cfg).
Vault functions access this file through a symbolic link from the "etc" directory located in the vsDomDocRoot directory. For example:

/usr/lpp/irg/pkrf/en/etc/raconfig.cfg→
. . /. . /etc/raconfig.cfg

The following are raconfig.cfg file settings:

RADATABASE defines the database name and access information to be used to hold the certificate application information for the associated application domain. The same RA Database can be used in multiple domains. All Vault Registration Application functions dynamically switch to the database settings defined for the request's application domain.

MasterRADN defines the Distinguished Name (DN) of the Master RA's vault. This value is used to determine which Master RA will process certificate applications for the associated application domain. A Master RA can be shared across multiple application domains. It will generate certificates and update database information based upon the application domain of the request and dynamically switch Application CA and RA Database connections as needed.

AppCertCA defines the name of the CA that will be used to generate certificates for approved applications. This name corresponds to the CA stanza in vsAppRegistry and is often "AppCA1". One or more application domains can reference the same Application CA.

VaultCertCA defines the name of the Vault CA as defined in vsAppRegistry. This value is usually "VaultCA". It is used to determine whether Vault Registration Application vault functions are operating within the shared vault or in a user vault. Presently the Vault Controller supports one Vault CA on a server. Therefore, this value is the same for all application domains.

EndUserS_policyexit defines the name and path of a program or script that will be called for each message received by the End User Support Master RA daemon. Policy exit programs can be associated with one or more application domains and used by one or more Master RAs.

Rasd_policyexit defines the name and path of a program or script that will be called for each message received by the RA Support Master RA daemon.

Notification letter templates define files and paths to a series of template e-mail letters. The letters will be sent to applicants informing them of various processing decisions; for example, approved or rejected. One or more application domains can use the same templates.

RA Desktop editing rules (for each certificate application) contain the original request variables and possibly variables returned from policy exits. This information is maintained internally as a URL formatted set of "name=value" pairs. The tag names, while descriptive, are usually not considered descriptive enough for most RA administrators. A series of editing rules provides the capability to provide alternative display literals and data entry rules for these variables.

Figure 6:
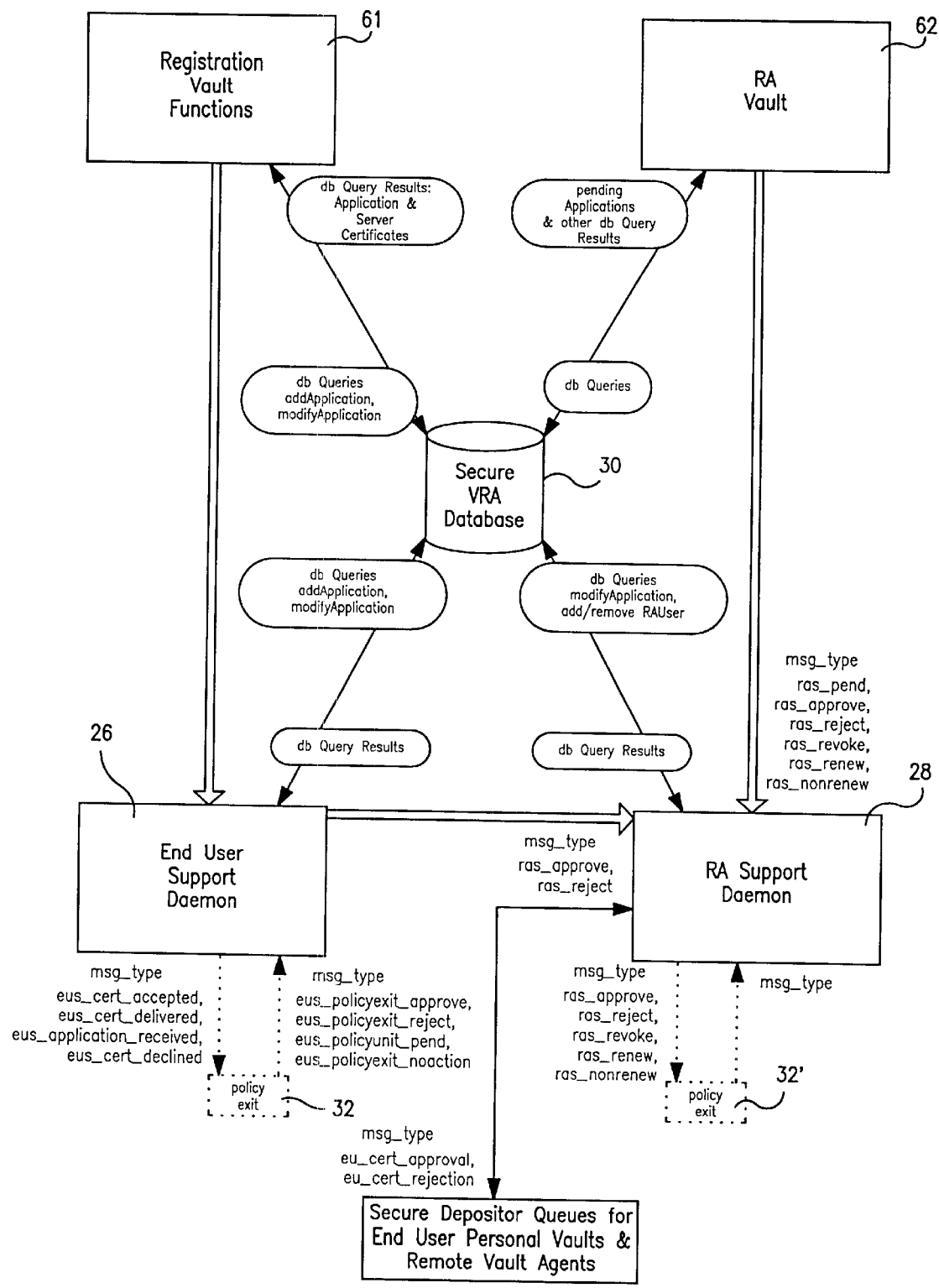
FIG. 6 is a representation of message flow in the registration application of FIG. 2.

In FIG. 6, the primary means of passing information in the application 20 is using messages conforming to a defined message format and content protocol within the Vault Registration Application. The informational content of each message is specific to the type of transaction being processed. Messages are transferred between Vault Registration Application components using one of two transport mechanisms:

Vault Controller Secure Depositor APIs for inter- and intra-vault message exchange; and Pipes to STDIN/STDOUT of policy exit programs for exchange of messages between Master RA daemons and policy exits.

The registration functions 61 running in user vaults communicate with the end user daemon 26 using message types: accepted; certificate accepted; delivered; received and declined. the functions 61 interact with the database to provide new applications and application modifications. The database returns the query results and server certificates to the functions 61. The daemon interacts with the database 30 to add or modify applications and return the results to the daemon. The daemon 26 also provides the messages to the policy exit 32 which returns the message types: approve; reject; pending and rejected. The daemon 26 provides the results to RA Support Daemon 28 using the message types: approve; reject. The daemon 28 received message types: pending; approve; reject; revoke; renew; non-renew from the RA vaults 61. The RA daemon 28 interacts with the database 30 in adding or removing RA users and modifying applications. The database returns the query results to the daemon 28. The RA daemon 28 also forwards the message types: approve; reject; revoke; renew; non-renew to the policy exit 32'. The daemon 28 returns an approval or rejection to the secure depositor queues for the end user personal vaults and the remote vault agents. The RA vaults 62 serving the Registration Authority 16 (See FIG. 1) communicate with the database 30 and the RA daemon 28. The RA sends database queries to the database which returns responses regarding pending applications and other database query results. The RA sends the daemon 28 messages types regarding pending application; approvals; rejections; renewing and non-renewing for processing, as previously described for daemon 26.

Figure 7A:
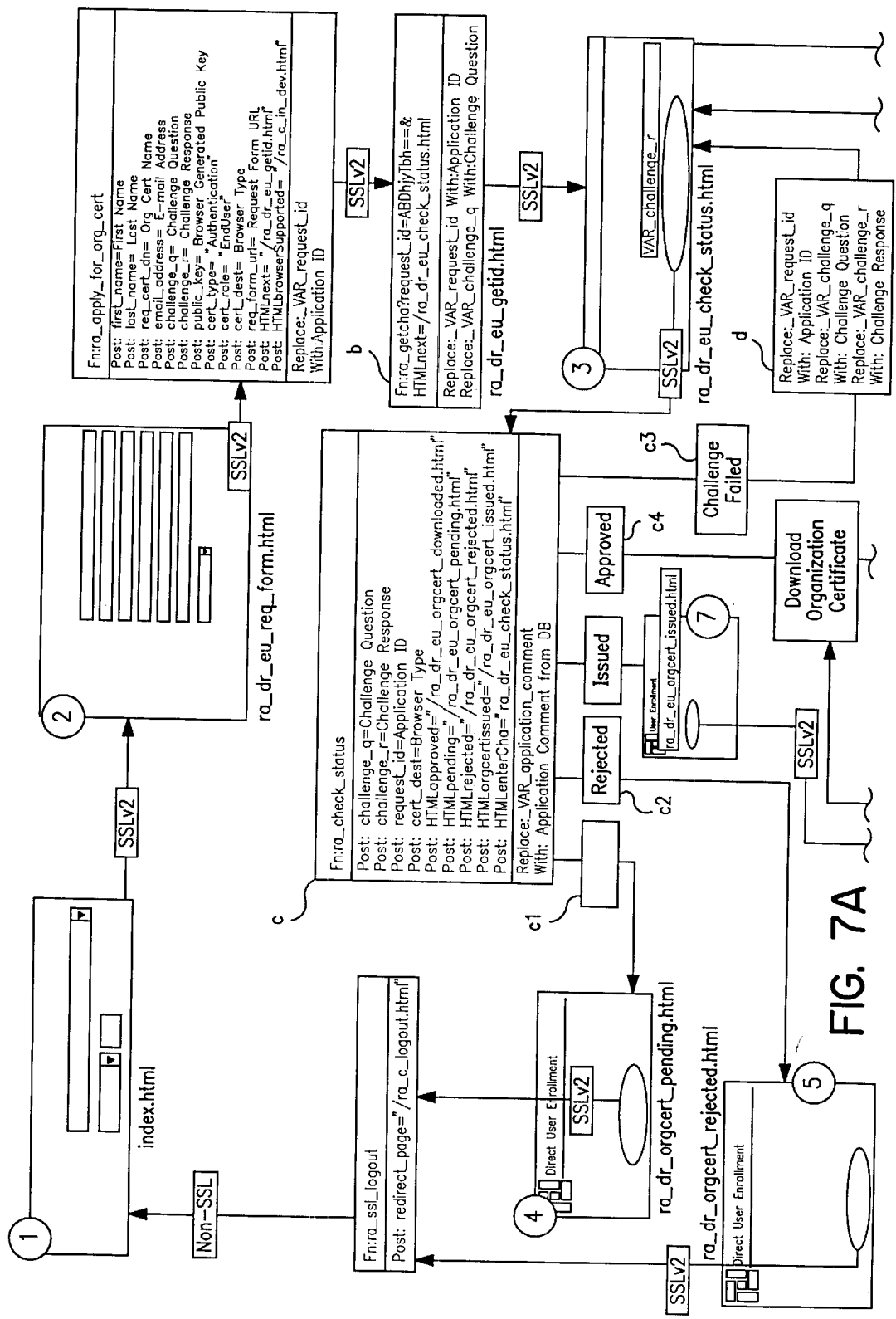
FIG. 7 is a flow diagram of a vault-based enrollment process for a certificate using the registration application of FIG. 2.
Figure 7B:
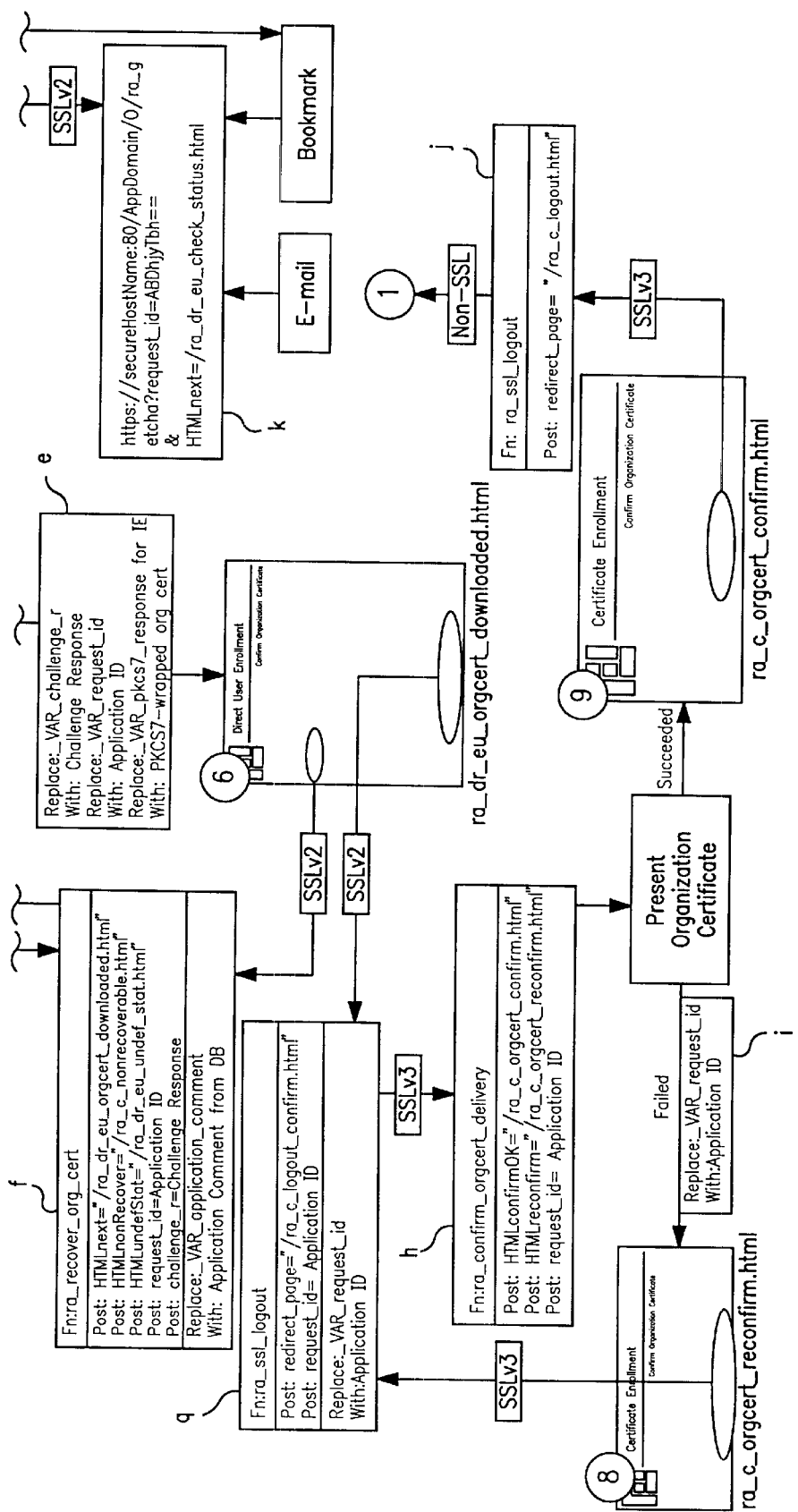

FIG. 7 is a flow diagram of end user interaction with the registration application for direct user enrollment. The enrollment is depicted by HTML screens 1–9 displayed to the end user and function (fn) boxes a–k executable by the registration application in connection with processing the end user requests for a digital certificate.

In screen 1 an end user fills in a service box with an entry "submit direct user enrollment" and in an application domain box enters "automated" which is the type of processing to handle the request for the domain. Alternatively, the end user could enter the service box with other types of requests, i.e., Enter Vault, and application domains, i.e., Manual. When the applicant clicks on the "Go" box, the browser encrypts the information using SSLv2 and sends to the registration application. The application returns screen 2 in which the end user provides entry for a "first name" box; a "last name" box; a certificate "name" to be applied to the certificate; an "e-mail" address box; a "challenge question" box; and a "challenge response" box that indicates the key size for the browser to employ in returning the screen to the registration application using SSLv2 after the "submit request" box is selected. The application performs the function "apply for organization certificate" shown in function box "a", establishes a record in the database defining the characteristics of the enrollment, and assigns an application ID to the request. In function box "b" the certificate is generated and replaces the request ID with an application ID and a "challenge question" which is sent to the end user browser using SSLv2 in generating screen number 3. The end user completes the "challenge response" to the "challenge question" and clicks on the "check enrollment status" box whereupon the browser encrypts the information using SSLv2 and returns to the registration application for processing. Depending upon the end user response to the challenge, the application performs the function "check status" shown in function box "c". Four alternative prprocesses may originate from function box "c". If further information is required from the end user, a pending process C1 initiates a screen 4 which advises the end user of the request status, whereupon the end user clicks on the certificate center box and returns to screen number 1. If the "challenge question" and "challenge response" do not match, a rejected process C2 is entered in which screen number 5 is presented and the user is advised of the nature of the rejection and screen number 1 is returned to the terminal. If the "challenge" failed, a process C3 is entered and the registration application performs the function box "d" which recreates screen number 3 for further action by the end user.

If the "challenge" question and "response" match, an approved process, C4, is entered in which an organization certificate is downloaded after the application performs the operation shown in function box "e" in which the vault application "request challenge" is replaced with the "challenge response"; the vault application registration request ID is replaced with an application ID; and an encoded certificate number generated by the application is wrapped using PKCS7. Upon completion of function "e", screen number 6 is displayed to the end user in which the end user clicks on a box to download the certificate whereupon the application performs function box "g" which disconnects the end user browser from the application. The end user browser is reconnected to the application 20 using SSLv3 in which client authentication is required. Thereafter, the application performs function box "h" in which confirmation of certificate delivery is requested. If the organization's certificate is not received by the browser, screen number 8 is displayed to the end user and the end user returned to the function box "g" using SSLv3 for another pass at confirming delivery of the organization's certificate. If the organization's certificate is received, screen number 9 is presented whereupon the end user clicks "on" the "confirm" box, after which the process returns to screen number 1.

Returning to function box "c", if a certificate has "issued", screen number 7 is displayed to the end user for recovering the organization's certificate in which the application performs function box "f". Likewise, if the certificate has been "lost" for one reason or another, screen number 6 enables an end user to click "on" the indication and go to function box "f". In both cases for screens number 6 and 7, an organization certificate is downloaded to the end user using function box "e" after which "confirmation is verified" using screen number 9, or "failure" using screen number 8.

Screen number 3 can be entered by e-mail or bookmark in which the application performs function box "k" and displays screen number 3, after which the certificate "issuing" process is completed as previously described.

Figure 8A:
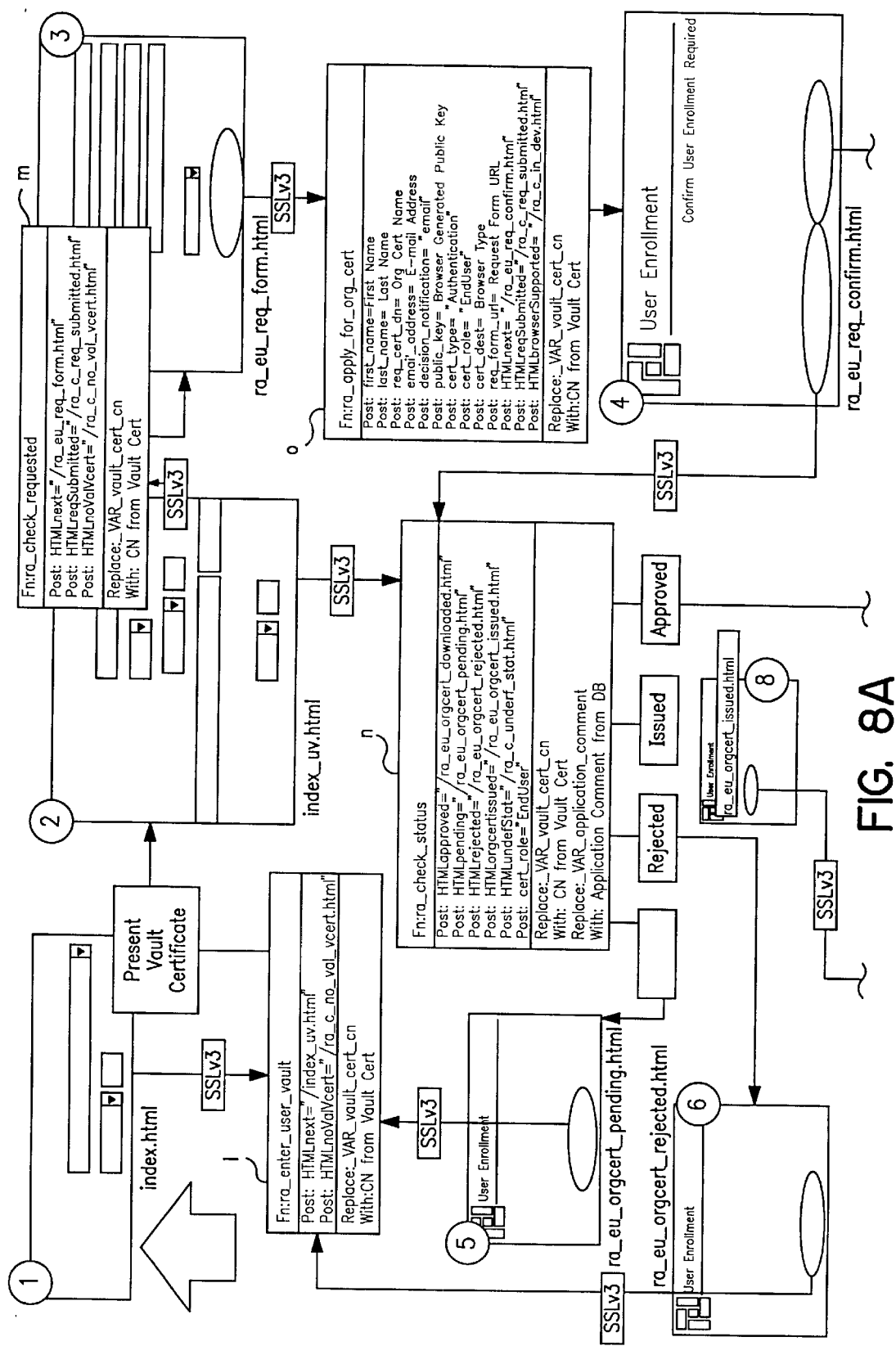
FIG. 8 is a flow diagram of a direct user enrollment process for a certificate using the registration application of FIG. 2.
Figure 8B:
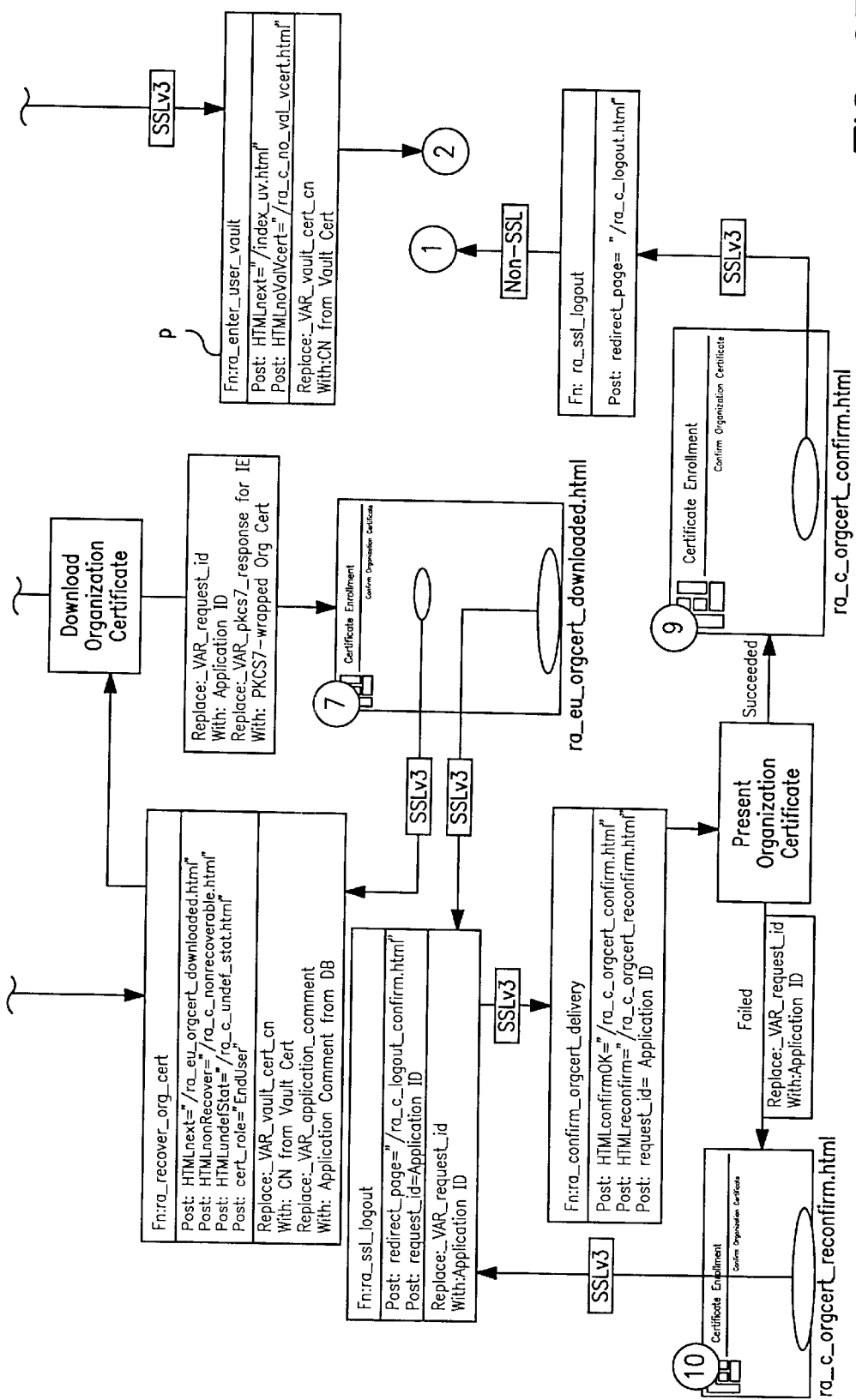

In FIG. 8, a process is described for a vault-based user enrollment in which the end user already possesses a certificate number for a vault. In screen number 1, the service box and application domain box are filled in by the user, as described in FIG. 7; and when the "go" button is clicked, the browser forwards the information to the registration application using SSLv3. The application performs function box "l" in which the application proceeds to present the vault based enrollment to the user using screen number 2. The end user fills in the type of service desired; the type of certificate; and the application domain, after which the "go" box is clicked "on" to initiate function box "m" or "n" depending upon the end user indicated "submit enrollment registration" or "check enrollment status". If "submit enrollment status" is the desired service, the application initiates function box "m" in which the vault certificate is replaced with the vault certificate number provided to the application which returns screen number 3 to the end user. The end user fills in the "first name", "last name", "organization certificate name", "e-mail address", and clicks on "submit request" to send the information to the application which performs function "o" to apply for an Organization certificate. Upon completion of the function "o", a screen number 4 is displayed to the end user indicating user enrollment, whereupon the end user can click on a box to enter the user vault in which the browser sends to the application to perform function "p" after which, the application is returned to screen number 2.

When a "check status" box of screen 4 is clicked, the browser sends the request to the application which performs function "n". The function "n" is almost identical to function "c" described in FIG. 7 except that "challenge questions" and "responses" are no longer required because the user has been identified with the vault certificate. Function "n" initiates the processes C1, C2, C4 and C5 previously described in FIG. 7, although the screen numbers have been renumbered to conform to the vault-based user enrollment. Specifically, screens numbered 5 and 6 correspond to screens numbered 4 and 5 in FIG. 7. Screen numbered 7 and 8 correspond to screen numbered 6 and 7 in FIG. 7. Screen numbers 9 and 10 correspond to screen numbers 8 and 9 in FIG. 7. Accordingly, further description in FIG. 8 of screen numbers 5–10 is not believed necessary in view of the corresponding description in FIG. 7.

Summarizing, a vault controller based registration application for web-based end users and registration authorities manages and administers the issuance of digital certificates over their lifetime. The application handles multiple end users and registration authorities either in an automated or mechanical mode and in different application domains. The registration process is conducted in a secure, end-to-end secure socket layer and dedicated personal vaults which are only accessible by the end user owner. As a result of these features, the registration application facilitates the conduct of electronic commerce in a distributed information system.

While the invention has been shown and described in conjunction with a preferred embodiment, various modifications and changes can be made without departing from the spirit and scope of the invention as defined in the appended claims in which:

We claim:

1. A secure, end-to-end communication system for conducting electronic commerce, comprising:
   an end user terminal coupled to the system;
   a server coupled to the system; and
   means included in the server for managing and administering the issuance, renewal and revocation of digital certificates for use in conducting electronic commerce on the system.

2. The communications system of claim 1 further including a registration application executable in the server for generating, managing and administering digital certificates in response to an input from the end user terminal.

3. The communications system of claim 1 further including dedicated vaults in the server for executing computer processes in the storage of data for an end user in connection with electronic commerce.

4. The communications system of claim 1 further including a database coupled to the managing and administrating means for digital certificates.

5. The communication system of claim 1 further including a registration application and server comprising an enrollment module; a desktop module; and a master registration authority vault.

6. The communication system of claim 1 further including a registration authority desktop terminal coupled to the system.

7. A secure, end-to-end communications system for conducting electronic business, comprising:
  a) an end user terminal coupled to the system;
  b) a registration authority terminal coupled to the system;
  c) a vault controller coupled to the system;
  d) a registration application executable in the vault controller in response to inputs from the end user terminal or a desktop terminal; and
  e) means included in the application for managing and administering the issuance, renewal and revocation of digital certificates for use by an end user in conducting electronic commerce on the system.

8. The communication system of claim 7 further comprising:
  f) an enrollment module executable in the registration application and providing end users with digital certificates in direct response to an end user having a vault certificate or without a vault certificate.

9. The communications system of claim 7 further comprising:
  g) an RA desktop module executable in the registration application and providing an end user with the digital certificate after approval of information provided by the end user.

10. The communication system of claim 7 further comprising:
  h) a master registration application executable in the vault controller and including an end user support module;
  i) a registration authority support module;
  j) an end user support policy exit module; and
  k) a registration authority support policy exit module.

11. A vault controller based registration application running in a vault controller for managing the issuance and administration of digital certificates for use in conducting electronic commerce in a distributed information system, comprising:
  a) an end user terminal and a registration authority terminal coupled to the vault controller;
  b) the registration application executable in the controller utilizing Secure Socket Layer (SSL) protocol and dedicated vaults in the controller to process requests for digital certificates from end users on an automated or manual basis;
  c) the registration application including an enrollment module which implements the process of applying for and receiving certificates;
  d) an RA desk top module which allows an administrator to review certificate requests and manage certificates;
  e) a master Registration Authority (RA) module which conducts the processing of requests and the generation of certificates; and
  f) a database coupled to the controller and serving as a repository of information about applicants, certificate requests, and their processing history.

12. In a secure, end-to-end communications system for conducting electronic business including an end user terminal coupled to the system; a registration authority terminal coupled to the system including an end user support module, an RA support module and a policy exit module; a vault controller coupled to the system, and a registration application executable in the vault controller in response to inputs from the end user terminal or a desktop terminal, a method of managing and administering the issuance, renewal and revocation of digital certificates for use by an end user in conducting electronic commerce on the system, comprising the steps of:
  a) submitting a user request for a digital certificate to access applications running in a secure environment in the system;
  b) receiving and reviewing the user request by a registration authority for approval or rejection of a digital certificate;
  c) forwarding the user request to certifying authority for signing of a digital certificate if approved by the registration authority; otherwise, notifying the end user the user request has been rejected; and
  d) returning the signed certificate to the registration authority for delivery to the end user.

13. The communication system of claim 11 wherein the end user support module processes certificate request messages from enrollment modules; performs initial creation of applicant and application records in a database; performs updates to application records to reflect receipt or status of requests; acceptance of downloaded certificates; delivery of certificates to end user; and providing an error phase to customer supplied domain specific policy exits.

14. The communications system of claim 11 wherein the RA support module processes certificate approvals and rejection requests received from the end user support module; processes certificate operation requests; interfacing with a certificate authority for creating, issuing and revoking certificates; and providing an interface to customer supplied policy exit programs.

15. The communications system of claim 11 wherein the policy exit modules respond to customer supplied programs for customizing registration application behavior and injecting customer organization policies and business rules into the certificate enrollment life cycle.

* * * * *